United States Patent
Tauvron

[19]

[11] Patent Number: 5,885,160
[45] Date of Patent: Mar. 23, 1999

[54] TORSION DAMPING DEVICE HAVING CIRCUMFERENTIALLY ACTING RESILIENT MEMBERS OF DIFFERENT STIFFNESS

[75] Inventor: Fabrice Tauvron, Creteil, France

[73] Assignee: Valeo, Paris, France

[21] Appl. No.: 793,117

[22] PCT Filed: Jun. 19, 1996

[86] PCT No.: PCT/FR96/00952

§ 371 Date: Feb. 19, 1997

§ 102(e) Date: Feb. 19, 1997

[87] PCT Pub. No.: WO97/00390

PCT Pub. Date: Jan. 3, 1997

[30] Foreign Application Priority Data

Jun. 19, 1995 [FR] France ................................. 95 07291

[51] Int. Cl.[6] ....................................................... F16D 3/14
[52] U.S. Cl. .......................... 464/63; 464/68; 192/213.12
[58] Field of Search .................................. 464/63, 64, 68; 192/213.1, 213.11, 213.12, 213.2, 213.21, 213.22; 74/374

[56] References Cited

U.S. PATENT DOCUMENTS

| | | |
|---|---|---|
| 4,471,863 | 9/1984 | Lech, Jr. . |
| 4,603,767 | 8/1986 | Blond ................................. 192/213.12 |
| 4,852,711 | 8/1989 | Kitano et al. . |
| 4,856,636 | 8/1989 | Meinhard .................................. 464/68 |
| 4,895,237 | 1/1990 | Maucher .................................. 464/68 |

FOREIGN PATENT DOCUMENTS

| | | |
|---|---|---|
| 648539 | 9/1964 | Belgium . |
| 2531162 | 2/1984 | France . |
| 4040606 | 6/1991 | Germany . |
| 1167749 | 10/1969 | United Kingdom . |
| 1251468 | 10/1971 | United Kingdom . |
| 2098702 | 11/1982 | United Kingdom . |
| 2183006 | 5/1987 | United Kingdom . |
| 2254398 | 10/1992 | United Kingdom . |

*Primary Examiner*—Eileen Dunn Lillis
*Attorney, Agent, or Firm*—Longacre & White

[57] ABSTRACT

A torsion damping device is disposed between two rotating elements, namely an input element (1) and an output element (2), the device comprising, firstly a main damper (10) referred to as a first damper and having circumferentially acting first resilient member (11), the first damper being directly acted on kinematically by the input element and secondly, a second predamper (20) having circumferentially acting second resilient members (21), the second damper being placed directly upstream of the output element (2). The device further includes an intermediate third damper (30) which is disposed kinematically between the first damper (10) and the second damper (20), the third damper (30) includes circumferentially acting third resilient members (31) the stiffness of which has a value intermediate between the stiffnesses of the first resilient members (11) and second resilient members (21) respectively.

15 Claims, 2 Drawing Sheets

U.S. Patent          Mar. 23, 1999          Sheet 1 of 2          5,885,160
Fig. 1
Fig. 2
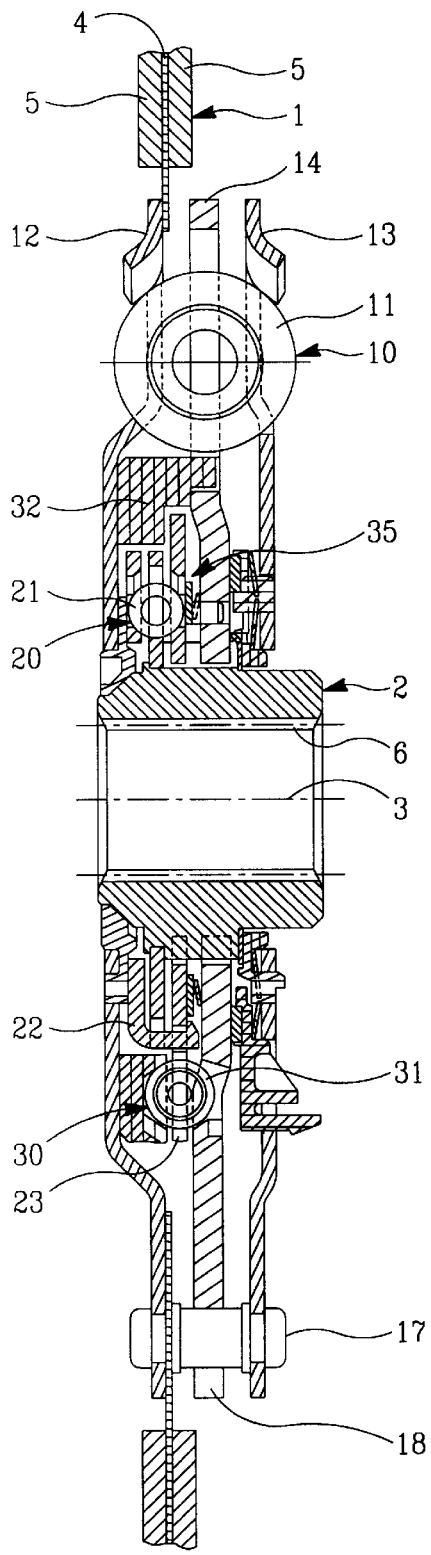
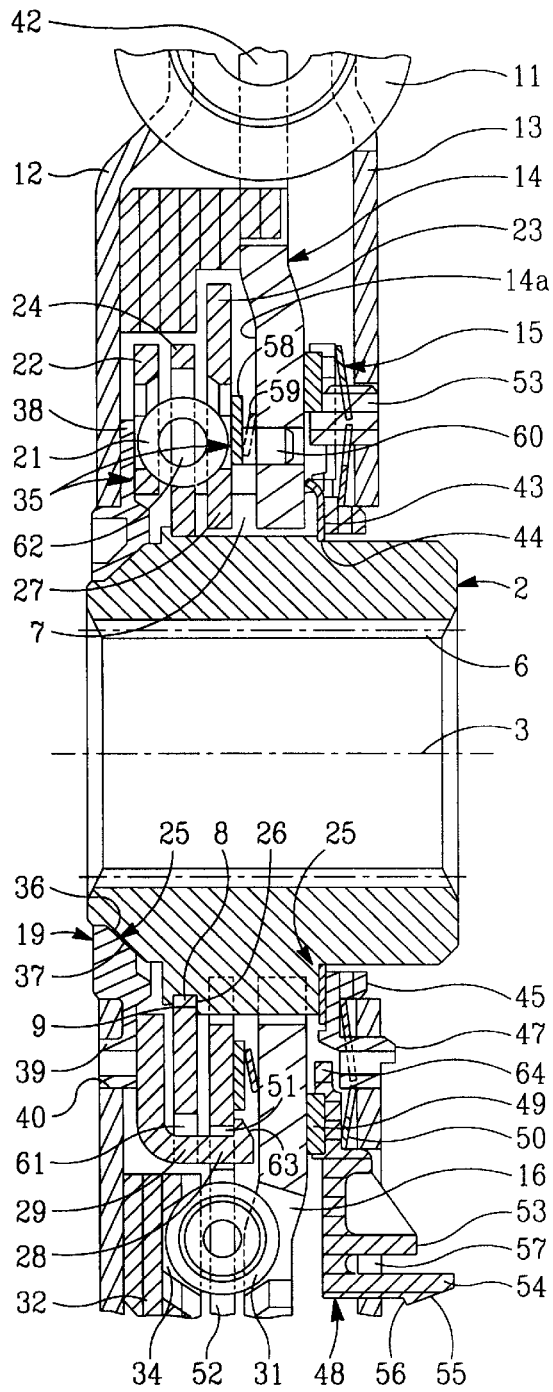

TORSION DAMPING DEVICE HAVING CIRCUMFERENTIALLY ACTING RESILIENT MEMBERS OF DIFFERENT STIFFNESS

BACKGROUND OF THE INVENTION

1. Field of Invention

The present invention relates to torsion damping devices, such as those which are for example incorporated in friction clutches for motor vehicles.

2. Description of the Prior Art

Friction clutches are known which are equipped with a torsion damping device comprising two torsion dampers: a main damper, or first damper, and a pre-damper, or second damper.

The first damper includes an input element which is fixed to two guide rings disposed on either side of a damper plate. The guide rings are coupled together by means of spacers which secure them together. The input element consists, in the case of application to a friction clutch, of a support disc, on each of the faces of which there are fixed friction liners that are adapted to be gripped between the pressure and reaction plates of the clutch.

In another version, the input element may consist of a disc which is fixed directly on an engine flywheel of the vehicle; this can also be one of the guide rings which is extended radially and which is fixed directly on the engine flywheel.

The input element, when it acts as a support disc for the friction liners, is backed on to one of the guide rings of the first damper, and is fixed to the latter by means of the spacers, or, in a modified version, by specific rivets.

The spacers extend through slots formed in the damper plate; in that case, the limitation of the angular displacement between the damper plate and the guide rings is obtained by cooperation of the spacers with the edge of the slots.

In another version, this limitation is obtained by interlocking of the turns of helical springs which constitute circumferentially acting resilient members, which are of high stiffness in this case, and which couple the guide rings and the damper plate elastically together.

The guide rings surround the output element of the damping device, which in general consists of a hub with internal splines; the same is true for the damper plate of the first damper, which meshes with the hub with a circumferential clearance. The first damper is accordingly directly acted on kinematically by the input element.

The pre-damper, or second damper, is disposed between the damper plate and one of the guide rings of the first damper, radially inwardly of the springs of the first damper.

The second damper is disposed, kinematically, directly upstream of the output element, and again comprises two guide rings disposed on either side of a damper plate, which is mounted on the hub, for rotation with the latter, by means of teeth. Resilient members, such as helical springs, couple the damper plate of the second damper to its associated guide rings; This damper plate of the second damper is seamed on to the hub, the splines of which have a different depth so as to define a shoulder which locates the said damper plate axially.

In such a device having two dampers, the guide rings of the second damper are coupled in rotation to the damper plate of the first damper.

The circumferentially acting springs of the second damper are less stiff than the circumferentially acting springs of the first damper. The second damper is adapted to absorb vibrations in the slow running mode of the engine, while the first damper is adapted to absorb vibrations in the normal travelling mode of the vehicle, or running mode.

The first and second dampers do give satisfaction, but in some cases problems arise.

For example, when, with a gear ratio engaged, the driver's foot is lifted on approaching a red light, the springs of the first damper are not well adapted to absorb the vibrations that occur in this mode; the same is true for the springs of the second damper, which are not stiff enough.

Another situation is also critical, namely driving in a line of traffic in traffic jams: the driver engages first gear and accelerates slightly, and here again the above mentioned dampers are not well adapted.

An object of the present invention is to overcome these drawbacks, and accordingly to optimise in a simple and inexpensive way the absorption of vibrations under all circumstances.

SUMMARY OF THE INVENTION

According to the invention, a torsion damping device disposed between two rotating elements, namely an input element and an output element, the device comprising, firstly, a main damper referred to as a first damper, having circumferentially acting resilient members referred to as first resilient members, the first damper being directly acted on kinematically by the inlet element, and, secondly, a pre-damper referred to as a second damper, having circumferentially acting resilient means referred to as second resilient means and being less stiff than the first resilient means, the second damper being disposed directly upstream of the output element, is characterised by the fact that it includes an intermediate damper referred to as a third damper, which is disposed kinematically between the first damper and the second damper, being arranged radially, firstly, mostly outwardly of the second damper, and, secondly, inwardly of the first resilient members, the third damper comprising circumferentially acting resilient members referred to as third resilient members, the stiffness of which is intermediate in value between the stiffnesses of the first resilient members and second resilient members respectively.

Preferably, each of the first damper and second damper comprises two guide rings which are disposed axially on either side of a damper plate, the circumferentially acting resilient members associated with each of the said dampers acting between the two guide rings and the respective damper plate flanked by the guide rings, the third damper also comprising two guide rings disposed axially on either side of a damper plate, the third resilient members acting between the two guide rings and damper plate, the damper plate of the third damper being constituted by one of the guide rings of the second damper, with one of the guide rings of the third damper being constituted by the damper plate of the first damper.

Preferably, the third damper is located in a housing which is defined axially between the damper plate and one guide ring of the first damper, and which is limited radially by the first resilient members.

Thanks to the invention, the third damper is well adapted for absorbing the vibrations that occur when the vehicle is, for example, moving in an intermittently starting and stopping line of traffic.

In addition, because of where this damper is located, the overall axial size of the damping device is the same as that in the prior art.

The third damper has numerous applications.

In this connection, it may have several stages, as may the other dampers, so that a highly progressive characteristic curve is obtained, with numerous gradients which are well adapted for all the possible operating modes of the vehicle. In addition, it enables the resilient members of the first damper to be fitted without being precompressed, which facilitates manufacture.

It is preferably the guide ring of the second damper that is the closer to the damper plate of the first damper that constitutes the damper plate of the third damper.

As a result of that arrangement, the second damper is not significantly modified, and use is made of the presence of the splines of the hub at that point.

This enables an intermediate friction device to be fitted which is specific to the third damper, and which is disposed between the damper plate of the first damper and the second damper, without there being any need to modify the friction devices of the other dampers.

According to a further feature, the damper plate of the first damper is cranked, in such a way that it has at its inner periphery a portion close to the axis and offset axially towards that guide ring which is not associated with the second damper; this avoids any increase in overall axial size, while providing accommodation for the friction device of the third damper.

Preferably, the other guide ring of the third damper is arranged as a confining member for its springs, the said confining member being mounted on the damper plate of the first damper for rotation therewith; the springs of the third damper are lodged in the damper plate of the first damper.

Preferably, the output element is a hub which is adapted to be mounted on a shaft, the hub and the second damper being pre-assembled so as to constitute a sub-assembly.

Preferably, the guide ring of the first damper which is not the guide ring associated with the second damper, on the one hand, and the friction device of the first damper on the other hand, are pre-assembled so as to constitute a sub-assembly.

The device in accordance with the invention can be applied with advantage to a motor vehicle: the input element is arranged to be fixed to, or to be securable to, the engine flywheel of the vehicle, with the output element being adapted to be coupled to the driven side of the gearbox of the vehicle.

For a better understanding of the subject of the invention, one embodiment, shown in the attached drawings, will now be described by way of purely illustrative and non-limiting example.

BRIEF DESCRIPTION OF THE DRAWINGS

FIG. 1 is a view in partial cross section of a friction clutch equipped with the torsion damping device in accordance with the invention;

FIG. 2 is a partial representation of part of FIG. 1 on a larger scale;

DETAILED DESCRIPTION OF THE PREFERRED EMBODIMENT

Figure 3:
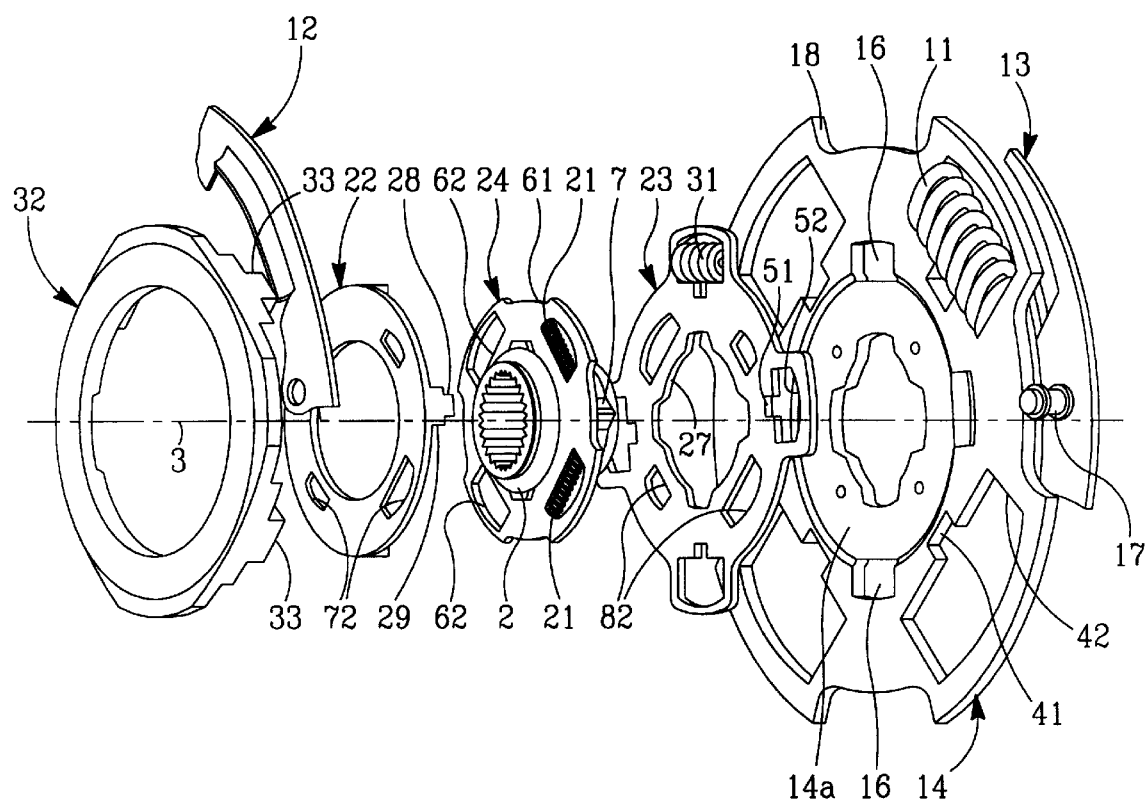
FIG. 3 is a partial perspective view of the main components shown in FIG. 2, but on a smaller scale.

Referring to the drawings, there can be seen a first damper 10 comprising an input element 1 fixed to two guide rings 12, 13 disposed on either side of a damper plate 14. The guide rings 12, 13 are joined together by means of spacers 17 which secure them together. Circumferentially acting resilient means 11, which in this example are helical springs, couple the damper plate 14 elastically to the guide rings 12, 13. The input element 1 consists, in the case of application to a friction clutch, of a support disc 4, on each of the faces of which there are secured friction liners 5 which are adapted to be gripped between the pressure and reaction plates of the clutch.

The disc 4 supporting the friction liners is backed on to one of the guide rings, 12, of the first damper 10, to which it is secured by means of the spacers 17.

The spacers 17 extend through slots 18 which are formed at the periphery of the damper plate 14; the angular displacement between the damper plate 14 and the guide rings 12 and 13 is limited by cooperation of the spacers 17 with the edges of the slots 18.

The guide rings 12 and 13 surround the output element 2 of the torsion damper, which consists of a hub splined internally at 6 having an axis 3; the same is true for the damper plate 14 of the first damper 10, which meshes, with a clearance, with external splines 7 of the hub 2, which has a portion 8 of reduced height at one of its ends.

The predamper, or second damper 20, is fitted axially between the damper plate 14 and one of the guide rings, in this example the guide ring 12, of the first damper 10, being disposed radially inwardly of the springs 11 of the said first damper 10.

The second damper 20 again has two guide rings, 22, 23, which are disposed on either side of a damper plate 24, the latter being mounted by means of teeth 26 on the portion 8 of the splines 7 of the hub 2, for rotation with the latter. Circumferentially acting resilient members 21, which in this example are helical springs, couple the guide rings 22, 23 elastically to the damper plate 24. This damper plate 24 of the second damper 20 is seamed on to the hub 2, the corresponding splines 8 of which have a height which is different so as to define a shoulder 9 which locates the said damper plate 24 axially.

The springs 21 of the second damper 20 are less stiff than the springs 11 of the first damper 10.

The second damper 20 is adapted to absorb vibrations in the slow running mode of the engine, while the first damper 10 is adapted to absorb the vibrations in the normal running mode of the vehicle, referred to as the travelling mode. Each of the dampers 10, 20 includes a specific axially-acting friction device 15, 25, in a manner to be described later herein.

In accordance with the invention, the torsion damping device is arranged in such a way that the guide ring 23 of the second damper 20 is extended radially outwardly so as to constitute the damper plate of an intermediate damper 30, referred to as a third damper, which comprises resilient members 31, referred to as third resilient members 31 and having a stiffness intermediate between those of the first resilient members 11 and the second resilient members 21; the greater part of the third damper 30 is located radially outwardly of the second damper 20, and the guide ring 23, with a radial extension, of the second damper 20 is provided at its inner periphery with a set of teeth 27 whereby it meshes with a clearance with the splines 7 of the hub 2, the clearance being smaller than the clearance defined between the damper plate 14 of the first damper 10 and the splines 7 of the hub 2.

The third resilient members 31, which are again circumferentially acting, consist of helical springs in this example. The third damper 30 is, in accordance with one feature, located radially inwardly of the first resilient members.

Preferably, it is the guide ring 23 of the second damper 20 closest to the damper plate 14 of the first damper 10 that constitutes the damper plate of the third damper 30.

Thanks to this arrangement, there is no substantial modification of the second damper 20, and use is made of the presence in this location of the splines 7 of the hub 2.

This enables an axially acting intermediate friction device 35 specific to the third damper, to be incorporated between the damper plate 14 of the first damper 10 and the second damper 20, without having to modify the friction devices 15, 25 of the other dampers 10, 20.

The damper plate 14 of the first damper 10 is of cranked form, so that it has at its inner periphery a portion 14A which is offset axially towards the guide ring 13 which is not associated with the second damper 20; this enables the overall axial size to avoid being increased, while accommodating the friction device 35 of the third damper 30.

Preferably, the other guide ring of the third damper 30 is formed as a confining member 32 for its springs 31, the said confining member 32 being mounted on the damper plate 14 of the first damper 10, for rotation with the latter, by means of axial tenons 33 with which it is provided, and which are engaged in slots 41 formed at the inner periphery of windows 42 that receive the springs 11; the springs 31 of the third damper 30 are lodged in housings 16 in the damper plate 14 of the first damper 10.

The guide rings 22 and 23 of the second damper 20 are rotatable together, by virtue of axial lugs 28 of the ring 22, which just extend into slots 51 formed at the inner periphery of windows 52 carried by the ring 23 for the purpose of receiving the springs 31 of the third damper 30. These axial lugs 28 are at the ends of axial arms 29, which are displaceable circumferentially in slots 61 of the damper plate 24, thus limiting its angular displacement with respect to the guide rings 22 and 23.

The circumferentially acting resilient members 21, of the second damper, being helical springs in this example, are lodged firstly in windows 62 of the damper plate 24, and secondly in windows 72 and 82 respectively of the guide rings 22 and 23; in the example shown, the springs 21 are of two types, with the two springs of each type being diametrically opposed to each other, the length of the springs of the two types being different, as are of course the lengths of the windows in which they are received.

The guide ring 32, configured as a confining member, is of moulded plastics material, and has seatings 34, in the form of recesses, for the springs 31. The circumferential ends of the seatings 34 serve as abutments for the circumferential ends of the springs 31.

The guide ring 12 is centred on the hub 2 by means of an interposed low friction bearing 19, a conical surface 36 of which cooperates with a complementary conical surface 37 formed on the hub 2. The bearing 19 comprises, firstly, a radial portion 38 which extends transversely between the guide rings 12 and 22, between which it is gripped, and secondly, axial spigots 39 which are lodged in complementary holes 40 of the guide ring 12, so that the latter and the bearing 19 are secured for rotation together.

A protective ring 44, which is of metal in this example, is applied against the transverse face 43 of the splines 7 which is located on the opposite side from the damper plate 24, by means of an application member 45 which is biassed axially by a Belleville ring 46 that bears on the guide ring 13; the application member 45 is fixed to the guide ring 13, for rotation with the latter, by means Of spigots 47 which are engaged in apertures formed in the guide ring 13. In a manner known per se, the protective ring 44 prevents the application member 45, which in this example is of plastics material as is the bearing 19, from being damaged by the splines 7.

The axially acting friction device 25 described above, associated with the springs 21, includes the bearing 19 itself and the rings 44, 45, 46. The associated friction members consist of the conical surfaces 36, 37, the protective ring 44 and the application member 45; it should be noted that the Belleville ring, besides applying the friction ring 44 on the said transverse face 43, applies the conical surfaces 36 and 37 against each other by reaction.

The application ring 45 is radially surrounded by a pad carrier member 48, which in this example is of a mouldable plastics material, and which has an annular friction pad 49 on that one of its surfaces that faces towards the damper plate 14; a Belleville ring 50 applies the pad 49 axially on to the damper plate 14, by bearing on the guide ring 13; axial spigots 53 secure the pad carrier member 48 and the guide ring 13 for rotation together; clipping fingers 54, having an inclined entry face 55 and a flange 56, and extending through apertures 57 in the guide ring 13, constitute with the latter a sub-assembly comprising the pad carrier member 48 and the resilient ring 50; because of radial extensions 64 of the pad carrier member 48, which extend radially in line with the application member 45, this sub-assembly also includes the application member 45 and its resilient ring 46.

The axially acting friction device 15 associated with the springs 11 thus comprises the components 48, 49, 50 and the guide ring 32, with the Belleville ring 50 applying the guide rings 12, 32 against each other by reaction.

The pad 49 and the damper plate 14 with which it cooperates, together with the guide rings 32 and 12 in contact with each other, constitute the friction members associated with this device 15.

A friction ring 58 is located axially between the guide ring 23 and the damper plate 14, being thrust axially against the guide ring 23 by means of a resilient ring 59 which bears on the damper plate 14; axial fingers 60, which in this example are in the form of round pegs, secure the friction ring 58 and the damper plate 14 for rotation together. The fingers 60 project from the ring 58, which is preferably made in a mouldable plastics material.

The radial portion 38 of the bearing 19, and the friction ring 58, in association with the rings 22, 23 respectively, constitute the friction members of the axially acting friction device 35 associated with the springs 31. The device 35 thus comprises the components 58, 59 and the radial portion 38 of the bearing 19. It is located radially inwardly of the third springs 31.

Operation is as follows.

When the input element 1 and the output element 2 are driven in rotation with respect to each other, in a first phase the less stiff springs, in this example the springs 21, become compressed, this compression being accompanied by the friction device 25 being put into action between the radial portion 38 and the ring 22 by virtue of the conical surfaces 36, 37, and then between the protective ring 44 and the ring 45; in a second phase it is the turn of the springs 31 to become compressed, with the friction device 35 adding its action to that of the friction device 25; in a third phase, the springs 11 are compressed in their turn, the friction device 15 then also coming into play; during this third phase, the action of the friction device 15 is augmented by that of the friction device 25, but only part of the friction device 35 is active here, i.e. that which comprises the radial portion 38, because the damper plate 14 and the guide ring 23 now rotate together.

More precisely, in the first phase no relative movement takes place between the damper plate 14 and the guide rings 12, 13 of the first damper 10, nor between the guide rings 22, 23 of the second damper 20 and the assembly consisting of the damper plate 14 and the guide ring 12 of the first damper 10, due to the fact that the springs 11, 31 have a greater stiffness than the springs 21. The action of the second friction device 25 is permanent, by contrast with the friction devices 15, 35.

In the second phase, the guide ring 23 meshes with the hub 6, and relative movement takes place between the damper plate 14 and the guide ring 23. During this relative movement, the axially acting friction device 35 operates, and the springs 21 remain compressed.

In the third phase, the damper plate 14 and the guide ring 23 are rotatable with the hub 6, and the springs 21, 31 remain compressed, due to the fact that the clearance between the damper plate 14 and the hub 6 has been taken up.

Preferably, the axial lugs 28 of the guide ring 22 carry at their ends radial clipping lugs 63 whereby they can be clipped on to the guide ring 23, so as thus to constitute a sub-assembly which comprises the said guide ring 23, the damper plate 24, the guide ring 22 and the springs 21.

It will be appreciated that the lugs 28 are short, because they do not have to provide a rotational coupling with the damper plate 14. This enables the rings 58, 59 to be fitted, the second damper 20 being coupled in rotation to the damper plate 14 through the second damper.

In another version, the radial portions 38 may of course be a separate component from the bearing 19, being then coupled in rotation to the guide ring 12. Some of the springs 11, 21, 31 may be made of resilient material. The structures may be reversed, with the damper plate 14 having projecting elements engaged in slots in the ring 32. It is also possible to vary the number of springs.

The ring 32 may be replaced by a ring of the same type as the ring 22 of the second damper 20, and a spacing ring of plastics material may optionally be interposed between the two rings 32, 12. The housings formed in the rings 12, 13 may be in the form of stamped-out portions.

As will be evident from the description and the drawings, the main damper 10 is acted on kinematically by the input element 1 direct, while the predamper 20 is arranged directly upstream of the output element 2. The third damper 30 is coupled in rotation to the damper plate 14 of the first damper 10.

The third resilient members 31 are fitted, firstly, radially inwardly of the first resilient members 11, and secondly, radially outwards of the second resilient members 21.

To this end, the guide ring 23, with its radial extension, is provided at its outer periphery with lugs 123 which project radially outwardly, and which in this example are spaced apart circumferentially at regular intervals.

These lugs 123 constitute the radial extension of the ring 23, and define between them circumferential slots 161, which permit axial displacement of the axial arms 133 of the confining member 32 carrying the terminal tenons 33 mounted in the slots 41 of the damper plate 14.

Because of the arms 133, which extend through the slots 161 with a circumferential clearance, the confining member 32 constitutes a spacer between the guide ring 12 and the damper plate 14. The tenons 33 alternate circumferentially with the housings 16, which are in the form of windows. The windows 52, for housing the third resilient members 31, are formed in the lugs 123.

The windows 52 are offset radially outwardly and circumferentially with respect to the windows 82 in which the second resilient members 20 are accommodated, so that the guide ring 23 is robust, and is made in a simple and inexpensive way.

The guide rings 22, 23 have a thickness such that the second resilient members 20 do not project axially with respect to the guide rings 22, 23, so that the friction ring 58 is able to engage frictionally against the guide ring 23 in the region of the windows 82 of the latter.

This is facilitated by the fact that the second resilient members 21 are able to be made small (i.e. to have a small diameter), due to the presence of the stiffer third resilient members 31.

It will be appreciated that the third damper 30 is in the image of the second damper 20, because the rotational coupling of the confining member 32 with the damper plate 14, and with angular displacement with respect to the guide ring 23, is in the image of the rotational coupling of the guide ring 22 with the guide ring 23 and with angular displacement with respect to the damper plate 24.

This facilitates standardisation, and makes the torsion damping device inexpensive, especially since the confining member 32 can easily be made by moulding.

These economies are enhanced by the fact that firstly, the damper plate 14 and the guide ring 23 constitute the output elements of the first damper 10 and the third damper 30 respectively, and secondly, they are part of the input element of the third damper 30 and the second damper 20 respectively, thus giving a reduction in the number of components and a reduction in overall axial size.

The set of teeth 27 of the ring 23, gives good control of initiation of the action of the third resilient members 30, while the arms 133 and the lugs 123, by coming into quiet abutment with each other, enable the said resilient members to be conserved, by keeping them in their compressed state.

The friction devices 15, 25, 35 are of course so chosen as to avoid obliteration of the action of their associated resilient members 11, 21, 31.

In this example, the load (i.e. the torque) which is exerted by the friction device 35 has a value lying between those of the loads (torques) which are exerted by the friction devices 15 and 25 respectively.

In this example there are four windows 52 and four springs 31. This does of course depend on the application.

It will be appreciated that this enables a torsion damping device to be obtained having a characteristic curve with a large number of gradients, for example two gradients for each damper 20, 30.

The guide ring 23 has many functions.

In general terms, the damper plates 14, 23, 24 of the dampers 10, 30, 20 are of reducing radial depth, and are offset axially with respect to each other by surrounding the hub in the manner described above, with or without circumferential clearance.

The output elements 14, 23, 24 of the dampers 10, 30, 20 are accordingly located directly upstream of the hub 2.

The third damper 30 includes a member 23 which constitutes its output element and which is part of the input element of the second damper 20. This member 23 meshes with the hub 2 with a circumferential clearance.

I claim:

1. A torsion damping device disposed between two rotating elements, namely an input element (1) and an output element (2), said device comprising, firstly, a first damper (10), having circumferentially acting first resilient members (11) the first damper being directly acted on kinematically by the input element, and, secondly, a second damper (20), having circumferentially acting second resilient means (21) and being less stiff than the first resilient means (11), the second damper being disposed directly upstream of the output element (2), wherein said device includes a third damper (30), which is disposed kinematically between the first damper (10) and the second damper (20), being arranged radially, firstly, mostly outwardly of the second damper (20), and, secondly, inwardly of the first resilient members (11), said third damper (30) comprising circumferentially acting third resilient members (31) referred to as third resilient members, the stiffness of which is intermediate in value between the stiffnesses of the first resilient members (11) and second resilient members (21) respectively.

2. A device according to claim 1, wherein each of the first damper (10) and second damper (20) comprises two guide rings (12, 22; 13, 23) which are disposed axially on either side of a damper plate (14, 24), the circumferentially acting resilient members (11, 21) associated with each of said dampers (10, 20) acting between the two guide rings (12, 22; 13, 23) and the respective damper plate (14, 24) flanked by the guide rings, wherein the third damper (30) also comprises two third guide rings disposed axially on either side of a damper plate, the third resilient members (31) acting between the two third guide rings and damper plate, said damper plate of said third damper (30) being constituted by one (23) of the second guide rings (22, 23) of the second damper (20), that guide ring being extended radially outwardly for this purpose, with one of the guide rings of said third damper (30) being constituted by the first damper plate (14) of the first damper (10).

3. A device according to claim 2, wherein the third damper (30) is located in a housing which is defined axially between the first damper plate (14) and one first guide ring (12) of the first damper (10), and which is limited radially by the first resilient members (11).

4. A device according to claim 2, wherein the first damper (10) and second damper (20) includes a friction device (15, 25) associated with the resilient members (11, 21) of that damper, wherein the third damper (30) also comprises a specific friction device (35) associated with the third resilient members (31).

5. A device according to claim 4, wherein the first damper plate (14) of the first damper (10) is cranked, in such a way that the first damper plate has a portion (14A) close to the axis (3) and offset axially towards that guide ring (13) of the damper which is not the guide ring (12) associated with the second damper (20).

6. A device according to claim 4, wherein the guide ring (13) of the first damper (10) and the friction device (15) of the first damper are pre-assembled so as to constitute a sub-assembly.

7. A device according to claim 2, wherein the guide ring of the third damper (30) is arranged as a confining member (32) for the third resilient members (31), the said confining member (32) being fixed to the damper plate (14) of the first damper (10) for rotation therewith.

8. A device according to claim 7, wherein the damper plate (14) of the first damper (10) has housings (16) which receive part of the third resilient members (31).

9. A device according to claim 8, wherein the output element (2) is a hub which is adapted to be mounted on a shaft, the hub (2) and the second damper (20) being pre-assembled so as to constitute a sub-assembly.

10. A device according to claim 9, wherein the guide ring, having a radial extension, of the second damper (20) is provided at an inner periphery with a set of teeth (27), the hub (2) has external splines (7), and the set of teeth (27) of said guide ring (23) meshes, with a clearance, with the external splines (7) of the hub (2).

11. A device according to claim 9, wherein the damper plate (14) of the first damper (10) is splined internally for meshing, with a clearance, with the external splines of the hub (2), and said clearance is greater than the clearance defined between the set of teeth (27) of said guide ring (23) having a radial extension and the external splines (7) of the hub (2).

12. A device according to claim 11, wherein said guide ring (23) with a radial extension has radially outwardly projecting lugs (123) at an outer periphery and in said lugs are provided with windows 152) referred to as third windows, for housing the third resilient members (31).

13. A device according to claim 12, wherein said guide ring with a radial extension has windows (82) referred to as second windows, for housing the second resilient members (20), and the third windows (52) are offset radially outwardly and circumferentially with respect to the second windows (82).

14. A device according to claim 12, wherein said lugs (123) define between them circumferential slots (161) which are traversed, with a circumferential clearance, by axial arms (133) of the confining member (32), and said axial arms carry terminal axial tenons (33) which are housed in slots (41) formed at the outer periphery of windows (42) which are formed, for housing the first resilient members (11), in the damper plate (14) of the first damper (10).

15. A device according to claim 1 for a motor vehicle, wherein the input element (1) is adapted to be secured or securable to the engine flywheel of the vehicle, the output element (2) being adapted to be coupled to the driven side of the gearbox of the vehicle.

* * * * *